US010926601B2

(12) United States Patent
Krnja et al.

(10) Patent No.: US 10,926,601 B2
(45) Date of Patent: Feb. 23, 2021

(54) TILTING VEHICLE AND METHOD OF CONTROL THEREOF

(71) Applicant: FORD GLOBAL TECHNOLOGIES, LLC, Dearborn, MI (US)

(72) Inventors: Filip Krnja, London (GB); Bruce Southey, Rowledge (GB); Emma Lundgren, Kallby (SE); Andrew John Murray, Colchester (GB)

(73) Assignee: Ford Global Technologies, LLC, Dearborn, MI (US)

( * ) Notice: Subject to any disclaimer, the term of this patent is extended or adjusted under 35 U.S.C. 154(b) by 266 days.

(21) Appl. No.: 16/183,641

(22) Filed: Nov. 7, 2018

(65) Prior Publication Data

US 2019/0135068 A1 May 9, 2019

(30) Foreign Application Priority Data

Nov. 8, 2017 (GB) ..................... 1718497

(51) Int. Cl.
*B60G 17/017* (2006.01)
(52) U.S. Cl.
CPC ...... *B60G 17/017* (2013.01); *B60G 2300/122* (2013.01); *B60G 2300/45* (2013.01); *B60G 2400/80* (2013.01); *B60G 2500/30* (2013.01); *B60G 2600/182* (2013.01); *B60G 2800/012* (2013.01); *B60G 2800/202* (2013.01); *B60G 2800/912* (2013.01)
(58) Field of Classification Search
CPC .............. B60G 17/017; B60G 2300/45; B60G 2300/122; B60G 2400/80; B60G 2500/30; B60G 2600/182; B60G 2800/012; B60G 2800/202; B60G 2800/912; B60W 10/22; B60W 50/08; B60W 2556/45
USPC .......................................................... 701/2
See application file for complete search history.

(56) References Cited

U.S. PATENT DOCUMENTS

| 3,246,781 A | 4/1966 | Ballamy | |
| 2015/0165856 A1* | 6/2015 | Horstman | E02F 3/845 280/6.154 |
| 2016/0134995 A1* | 5/2016 | McCoy | H04W 4/80 455/41.2 |

FOREIGN PATENT DOCUMENTS

| DE | 102007056303 A1 | 5/2009 |
| DE | 102008006849 A1 | 8/2009 |
| FR | 1421536 A | 12/1965 |
| GB | 1004643 A | 9/1965 |
| JP | 2012081784 A | 4/2012 |
| JP | 2013001166 A | 1/2013 |
| JP | 2013060084 A | 4/2013 |
| WO | 2012057659 A1 | 5/2012 |

OTHER PUBLICATIONS

GB Examination Report GB 1 718 497.9 Filed Apr. 24, 2018. 8 pages.

(Continued)

*Primary Examiner* — Maceeh Anwari
(74) *Attorney, Agent, or Firm* — Brooks Kushman P.C.; Ray Coppiellie

(57) ABSTRACT

A method of tilting a vehicle is provided, and a vehicle is provided. The vehicle has a tilt control system to control the tilt of the vehicle. The method includes tilting the tilting vehicle and/or another tilting vehicle in response to at least one external trigger.

16 Claims, 5 Drawing Sheets

(56) References Cited

OTHER PUBLICATIONS

Video clip entitled "2013 Las Vegas Hop" uploaded by user lowridermagazine published on Feb. 5, 2014, Retrieved from Internet https://www.youtube.com/watch?v=U7LDY07GZjA.

* cited by examiner

TILTING VEHICLE AND METHOD OF CONTROL THEREOF

CROSS-REFERENCE TO RELATED APPLICATIONS

This application claims foreign priority benefits under 35 U.S.C. § 119(a)-(d) to GB Application 1 718 497.9 filed Nov. 8, 2017, which is hereby incorporated by reference in its entirety.

TECHNICAL FIELD

This disclosure relates to a tilting vehicle and a method of tilting the vehicle, and a method of tilting a vehicle in response to one or more triggers.

BACKGROUND

A vehicle may be equipped with one or more systems to control the handling and stability of the vehicle. For example, a vehicle may be equipped with an active suspension system configured to optimize the handling and stability of the vehicle, e.g. whilst the vehicle performs a dynamic maneuver.

In some cases, the active suspension system may also be configured to control the amount by which the vehicle tilts when the vehicle is stationary. In this manner, access into and out of the vehicle may be improved by adjusting the amount by which the vehicle leans toward or away from an individual.

However, it can be expensive to equip a vehicle with an active suspension system. As such, it is desirable to use the active suspension system for one or more other purposes in order to justify the cost of installing the active suspension system to the vehicle.

SUMMARY

According to an aspect of the present disclosure there is provided a method of tilting a vehicle, the vehicle having a tilt control system configured to control the tilt of the vehicle, the method comprising tilting at least one of the tilting vehicle and another tilting vehicle in response to at least one external trigger.

The tilt control system may be configured to control the amount by which the vehicle tilts. The method may comprise tilting the vehicle when a proximity sensor of the vehicle determines that another article is less than a predetermined distance away from the vehicle. The method may comprise initiating a tilting sequence upon the control system of the vehicle receiving a signal from at least one of a central server, a mobile device and a vehicle key. The method may comprise sending a signal from the control system of the vehicle to at least one of a central server and another tilting vehicle to cause the other tilting vehicle to tilt. The method may comprise establishing an operative connection between the control system and an active suspension system of the vehicle. The method may comprise establishing an operative connection between the control system and the proximity sensor of the vehicle.

In the context of the present disclosure, the term "tilt" is understood to mean at least one of roll and pitch. For example, if an article were to roll, it may be seen to tilt side to side, and if an article were to pitch, it may be seen to tilt forward and backward. The present disclosure provides a control system for a tilting vehicle, the control system being configured to control the amount by which the tilting vehicle rolls and/or pitches. The action of pitching and rolling are not mutually exclusive. For example, the control system may be configured to allow the vehicle to simultaneously pitch and roll.

The method may comprise determining if at least one of the course of the vehicle and the course of the another article will result in a collision between the vehicle and the another article. The method may comprise tilting the vehicle to avoid the collision between the vehicle and the another article.

The method may comprise tilting the vehicle whilst the vehicle is in motion. The method may comprise tilting the vehicle whilst the vehicle is static.

The amount by which the vehicle tilts may be a function of, e.g. proportional to, the distance between the vehicle and the another article. The amount by which the vehicle tilts may be proportional to the distance between the vehicle and the another article.

The tilting sequence may comprise a first movement to tilt the vehicle in a first direction. The tilting sequence may comprise a second movement to tilt the vehicle in a second direction. The first direction may be different to the second direction. For example, the first direction may be opposite to the second direction.

The method may comprise tilting the vehicle in a first direction and tilting the another vehicle in a second direction that is different to the first direction.

The method may comprise tilting the vehicle when the vehicle is connected to a vehicle charging point. For example, the method may comprise tilting the vehicle only when the vehicle is connected to a vehicle charging point.

The method may comprise tilting the vehicle whilst the vehicle is stationary, for example, temporarily stationary during a vehicle journey, such as when the vehicle is stopped at a traffic signal.

The method may comprise tilting the vehicle when the vehicle is switched off. For example, when a motor of the vehicle is switched off and/or when an ignition switch of the vehicle is switched off.

The method may comprise tilting the vehicle when the vehicle is at or near to a predetermined location. For example, the method may comprise determining the location of the vehicle, e.g. using a global positioning satellite (GPS) system, and tilting the vehicle when, e.g. only when, the vehicle is at or near to a predetermined GPS location. The method may comprise determining the location of at least one of an individual's mobile device, such as a smart phone, and a key of the vehicle, such as remote key fob and/or a Phone as a Key (PaaK). The method may comprise tilting the vehicle when the determined location of the individual's mobile device and/or the PaaK is within a predetermined distance of the tilting vehicle.

The control system may be configured to poll for at least one of an individual's mobile device and a key of the vehicle. In the context of the present disclosure, the term "poll" (or "polling") is understood to mean the checking, e.g. the continuous or repeated checking, of other programs or devices by one program or device to ascertain what state they are in, for example, to ascertain whether they are connected to another device and/or if another device is attempting to communicate.

The method may comprise manually tilting the vehicle by virtue of a control switch. The control switch may comprise a physical switch, such as a lever or dial. The control switch may be provided on the vehicle. The control switch may be provided on a key of the vehicle. The control switch may be provided as a part of an application on a mobile device. The control switch may be operatively connected to the steering wheel of the vehicle. The control switch may be actuated by tilting the steering wheel, for example by virtue of inclining a radial plane of the steering wheel relative to the rotational axis of a steering column of the vehicle. The method may comprise tilting the steering wheel to cause the vehicle to tilt. For example, the method may comprise inclining a radial plane of the steering wheel relative to the rotational axis of a steering column of the vehicle to cause the vehicle to tilt.

The method may comprise moving, e.g. tilting, a seat of the vehicle depending on the amount by which the vehicle tilts. For example, where the vehicle tilts in order to increase the ease of access into or out of the vehicle, a seat of the vehicle may be configured to tilt, for example in a direction opposite to that in which the vehicle tilts.

According to another aspect of the present disclosure there is provided a tilting vehicle having a tilt control system configured to tilt of the vehicle in response to at least one external trigger.

The tilt control system configured may be configured to tilt the vehicle when a proximity sensor of the vehicle determines that another article is within a predetermined distance of the vehicle. The tilt control system configured may be configured to initiate a tilting sequence upon the control system of the vehicle receiving a signal from at least one of a central server, a mobile device and a vehicle key. The tilt control system configured may be configured to send a signal from the control system to at least one of a central server and another tilting vehicle to cause the other tilting vehicle to tilt. The control system may be operatively connected to an active suspension system of the vehicle. The control system may be operatively connected to the proximity sensor of the vehicle.

According to an aspect of the present disclosure there is provided a tilt control system for a tilting vehicle, the control system being configured to operatively connect to an active suspension system of the vehicle and a proximity sensor of the vehicle, wherein the control system is configured to control the amount by which the vehicle tilts depending on the proximity of another article to the vehicle. The control system may be configured to control the amount by which the vehicle tilts when it is determined that the other article is less than a predetermined distance away from the vehicle.

According to an aspect of the present disclosure there is provided a tilt control system for a tilting vehicle, the control system being configured to operatively connect to an active suspension system of the vehicle and at least one of a central server, a mobile device and a vehicle key, wherein the control system is configured to initiate a tilting sequence upon receiving a signal from at least one of the central server, the mobile device and the vehicle key.

According to an aspect of the present disclosure there is provided a tilt control system for a tilting vehicle, the control system being configured to operatively connect to an active suspension system of the vehicle and at least one of a central server and another tilting vehicle, wherein the control system of the vehicle is configured to send a signal to at least one of the central server and the other tilting vehicle to cause the other tilting vehicle to tilt.

According to another aspect of the present disclosure there is provided a tilt control system for a tilting vehicle, the control system being configured to: control the amount by which the vehicle tilts when installed to the vehicle, and at least one of: tilt the vehicle when a proximity sensor of the vehicle determines that another article is within a predetermined distance of the vehicle; initiate a tilting sequence upon the control system of the vehicle receiving a signal from at least one of a central server, a mobile device and a vehicle key; and/or send a signal from the control system to at least one of a central server and another tilting vehicle to cause the other tilting vehicle to tilt. The control system may be operatively connected to an active suspension system of the vehicle.

There may be provided a vehicle comprising at least one of the above control systems.

According to an aspect of the present disclosure there is provided a vehicle tilting system, the vehicle tilting system comprising: a first tilting vehicle; a second tilting vehicle; and a tilt control system configured to operatively connect with an active suspension system of a first tilting vehicle and an active suspension system of a second tilting vehicle, the control system being configured to control the amount by which the second tilting vehicle tilts in response to the tilting of the first tilting vehicle.

The disclosure also provides software, such as a computer program or a computer program product for carrying out any of the methods described herein, and a computer readable medium having stored thereon a program for carrying out any of the methods described herein. A computer program embodying the disclosure may be stored on a computer-readable medium, or it could, for example, be in the form of a signal such as a downloadable data signal provided from an Internet website, or it could be in any other form.

To avoid unnecessary duplication of effort and repetition of text in the specification, certain features are described in relation to only one or several aspects or arrangements of the disclosure. However, it is to be understood that, where it is technically possible, features described in relation to any aspect or arrangement of the disclosure may also be used with any other aspect or arrangement of the disclosure.

DETAILED DESCRIPTION

Figure 1A:
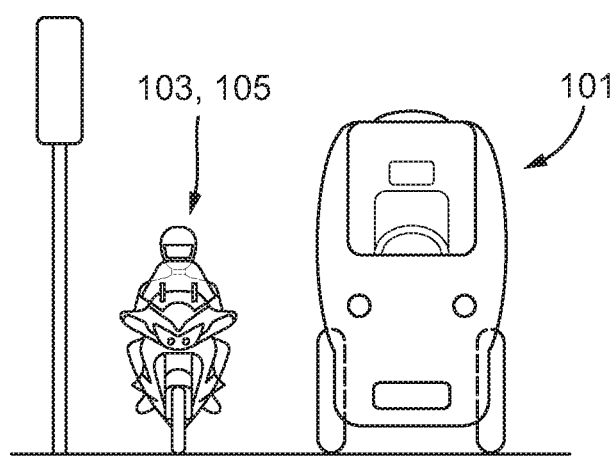
FIGS. 1A, 1B, and 1C illustrate a method of tilting a vehicle.

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

The present disclosure provides a tilting vehicle and a method of tilting the vehicle. For example, the present disclosure may provide a method of controlling the amount by which a horizontal plane of the vehicle is inclined to the surface on which the vehicle is situated, in response to one or more triggers. The vehicle may be any type of vehicle, such as a car, a van, a truck or a three-wheeled vehicle. The vehicle is supported on an underlying surface by a plurality of traction devices such as wheels. In particular, the vehicle may be a motor vehicle which may be designed to be used primarily in urban areas and conurbations, for example an urban vehicle, a city car or a subcompact. The vehicle may be an electric vehicle, a hybrid vehicle or a vehicle having an internal combustion engine.

In one arrangement, the vehicle may be a vehicle having a narrow track and/or a centreline driving position, which allows the vehicle to take advantage of a very tight parking space, for example a parking space being only just wider that the width of the vehicle. Such parking spaces are becoming increasingly common in urban areas as a result of an increase in the popularity of urban vehicles. In particular, the vehicle may be a single-seater vehicle designed such that the driver can enter/exit the vehicle from either side of the vehicle. However, the vehicle may be a multi-seater vehicle, for example a multi-seater vehicle having an in-line or a staggered seating arrangement.

Irrespective of the type of vehicle, the vehicle may be equipped with one or more systems configured to control the amount by which the vehicle tilts in at least one of a lateral direction and a longitudinal direction of the vehicle. In some cases, the vehicle may be fitted with an active suspension system configured to control the amount by which the body of the vehicle rolls and/or pitches whilst performing a dynamic maneuver, such as cornering and/or accelerating. Additionally or alternatively, the active suspension system may be configured to tilt the vehicle whilst the vehicle is stationary, for example to aid a passenger getting into or out of the vehicle, and/or to aid the loading of cargo into or out of the vehicle. According to an embodiment, the vehicle is controlled to tilt while the traction devices remain in contact with the underlying surface, e.g. without lifting the traction devices or wheels from the ground.

In one arrangement, the disclosed method may use an existing active suspension system of the vehicle to control the amount by which the vehicle tilts in response to one or more triggers, such as the proximity of another article to the tilting vehicle and/or the operational condition of another vehicle. The present disclosure is advantageous, therefore, as it allows for existing vehicle hardware to be repurposed, which increases the functionality of the vehicle through the implementation of additional control strategy. In one arrangement, an existing controller of the vehicle, e.g. an active suspension controller, may be reconfigured, e.g. reprogrammed and/or by the addition of another control module, to allow for the vehicle to be tilted in accordance with the present disclosure. However, the vehicle may be equipped with one or more systems configured to control the amount by which the vehicle tilts independently from and/or in in addition to the control of an active suspension system.

Figure 1B:
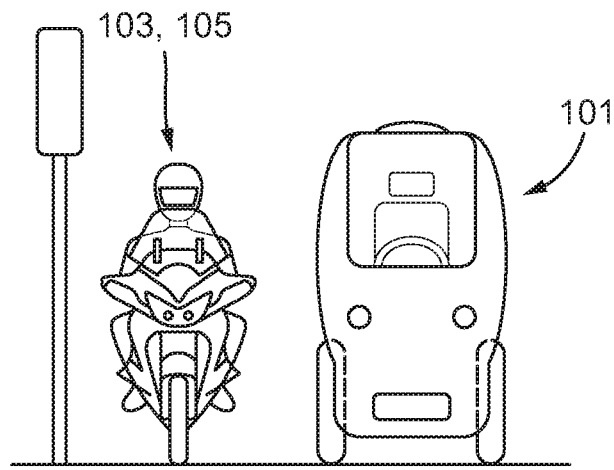
Figure 1C:
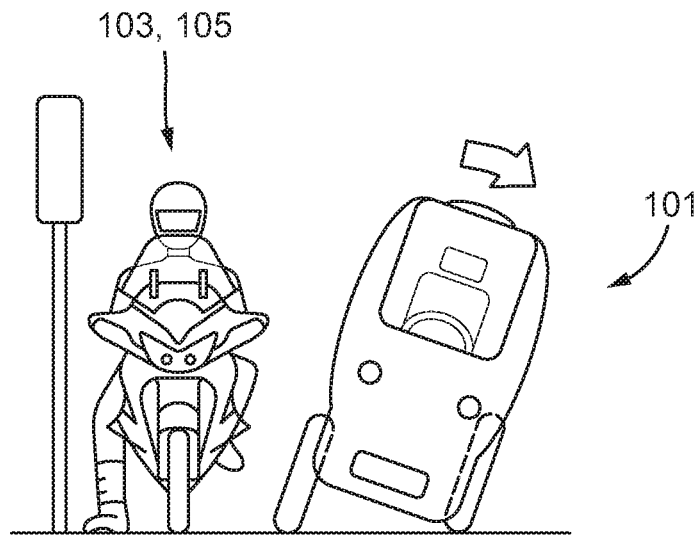
Figure 7:
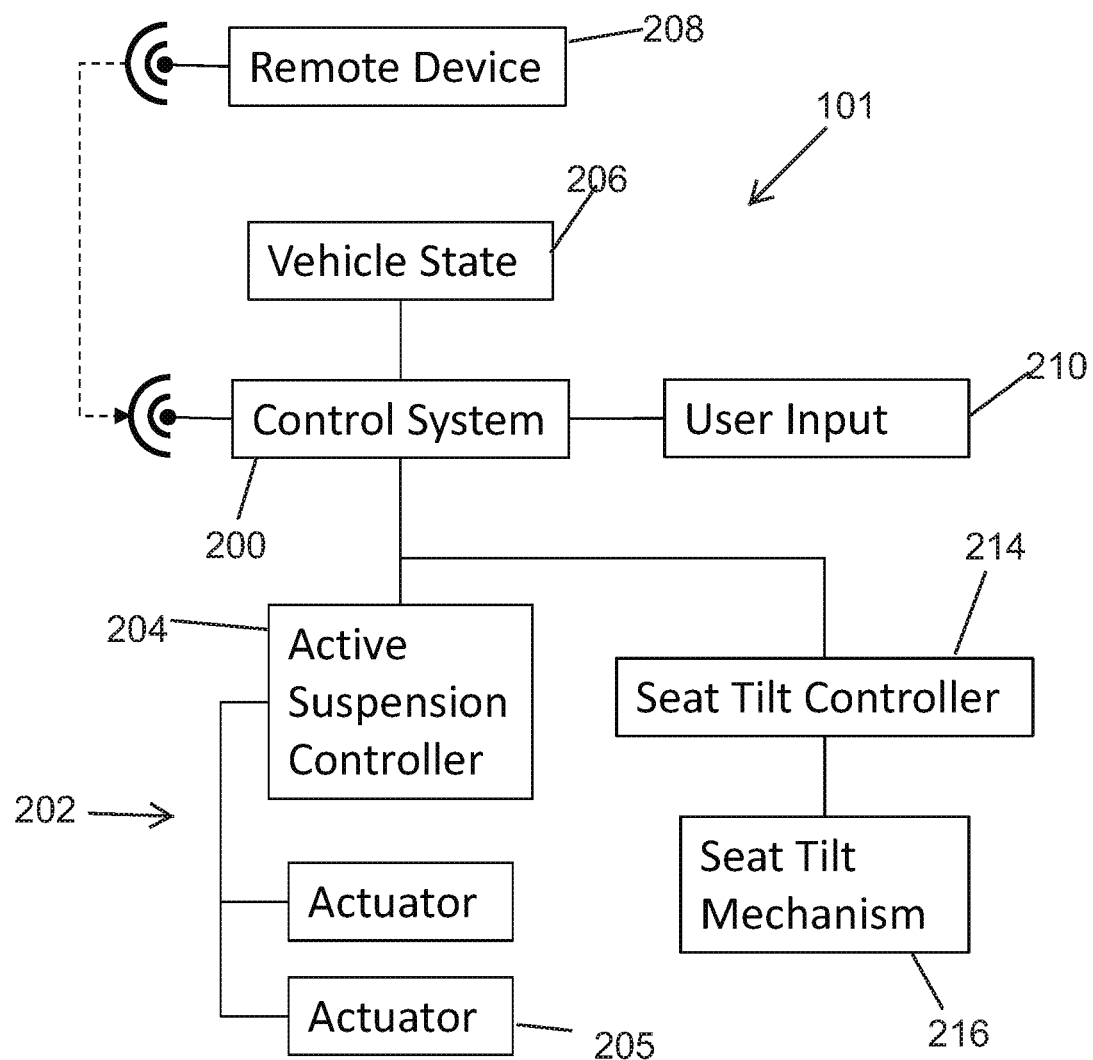
FIG. 7 illustrates a schematic of a vehicle for use with the methods of FIGS. 1-6 according to an embodiment.

FIGS. 1A, 1B, and 1C depict a method 100 of tilting, e.g. leaning, a tilting vehicle 101 away from another article 103. In FIGS. 1A, 1B, and 1C, the tilting vehicle 101 is a single-seater vehicle and the other article 103 is a motor-cycle 105. A schematic of a vehicle 101 for use with the methods as described herein is shown in FIG. 7. The vehicle 101 comprises a control system 200 operatively connected to an active suspension system 202 of the vehicle 101, the control system being configured to control the amount by which the vehicle 101 tilts. For example, the control system may comprise a control module of an electronic control unit and/or an active suspension controller 204. The active suspension system 202 controls the amount by which the vehicle body tilts in at least one of a lateral direction and a longitudinal direction of the vehicle, or rolls and/or pitches, by controlling actuators 205 associated with the active suspension system 202 while the vehicle is performing a dynamic maneuver or is stationary.

Figure 4:
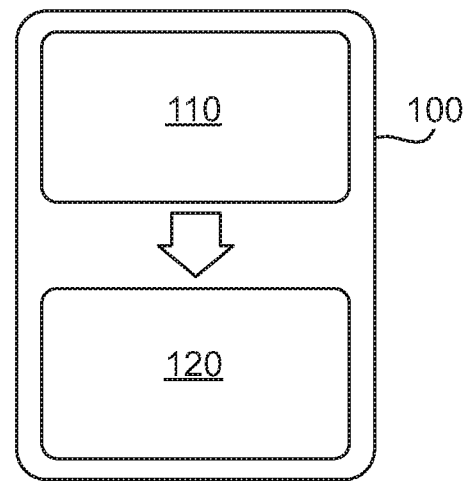
FIGS. 4, 5, and 6 each illustrate flow charts in relation to the respective methods depicted in FIGS. 1A-3C.

FIG. 4 shows a flowchart that depicts the method 100 of tilting the vehicle 101, the method 100 having steps 110 and 120, which correspond to the scenario illustrated in FIGS. 1A, 1B, and 1C. Although not shown, steps 110 and 120 of FIG. 4 may be used in conjunction with any of steps 130 and 140 shown in FIG. 5, and any of steps 150 and 160 shown in FIG. 6, where technically possible.

In FIG. 1A, the vehicle 101 is situated on a road next to a traffic signal. However, the method is not limited to the scenario shown in FIGS. 1A, 1B, and 1C, and it is understood that the disclosed tilting car 101 and method 100 of control thereof may be used in any appropriate situation, for example in a situation where the vehicle 101 is near to or adjacent a structure in a parking lot/parking garage. Indeed, the other article 103 may be any appropriate type of article, such as another parked vehicle, an article of road furniture, or a structure, such as a wall/pillar.

In FIG. 1A, the motorcycle 105 is situated far away from the vehicle 101, for example in a position where the motorcycle 105 is approaching the vehicle 101 from behind the vehicle 101. As such, the driver of the vehicle 101 may not be aware that the motor cycle 105 is approaching the vehicle 101, or may simply have chosen to pay little attention to the motor cycle 105 due to its remote location from the vehicle 101.

FIG. 1B shows the motorcycle 105 closer to the vehicle 101, in a position where at least one proximity sensor 206 of the vehicle 101 is able to detect the motor cycle 105. The proximity sensor may be any appropriate type of sensor, for example an ultrasonic sensor or an electromagnetic sensor. Since it is common for a modern vehicle to be fitted with a parking sensor, the control system of the vehicle 101 may be operatively connected to at least one existing parking sensor of the vehicle 101, so that an input from the parking sensor to the control system may be used to control the amount by which the vehicle 101 tilts.

In FIG. 1C, the motorcycle 105 has moved to a position next to, e.g. immediately to the side of, the vehicle 101 to cause the vehicle 101 to lean away from the motorcycle 105. For example, the control system of the vehicle 101 causes the vehicle 101 to lean away from another article 103, e.g. the motorcycle 105, when it determines that the other article 103 is less than a predetermined distance from the vehicle 101. The predetermined distance may be any appropriate distance, e.g. 50 cm, 20 cm, or 10 cm. In one arrangement, the predetermined distance may be the distance by which a body portion of the vehicle, e.g. a wing mirror, projects from the vehicle body. In this manner, the method 100 of tilting the vehicle 101 may comprise a step of measuring the proximity of another article 103 that is close to the vehicle 101, a step 110 of determining that the other article 103 is less than a predetermined distance away from the vehicle 101, and a step 120 of tilting the vehicle 101 in response to the determined proximity of the other article 103, which is exemplified in the scenario shown in FIGS. 1A, 1B, and 1C.

The control system may be configured to cause the vehicle 101 to lean if it is determined that at least one of the course of the vehicle 101 and the course of the other article 103 will result in a collision between the vehicle 101 and the other article 103. For example, in the arrangement shown in FIG. 1C, it is understood that if the vehicle 101 were to not lean away from the motorcycle 105, the vehicle 101 and the motorcycle 105 would be in contact with one another. The course of the vehicle 101 and/or the other article 103 may be determined by virtue of the proximity sensor of the vehicle 101. For example, the proximity sensor may be used to determine the speed and/or the direction of the other article 103, so as to compute a likely course of the other article 103. Additionally or alternatively, the control system of the vehicle 101 may be operatively coupled to a sensor to determine a vehicle state 206 such as at least one of a global positioning satellite (GPS) system, a parking spot measurement system, a blind spot information system (BLIS) and/or a cross-traffic alert (CTA) system, in order to determine the course of the other article 103 in relation to the vehicle 101.

In one arrangement, the vehicle 101 and the motorcycle 105 may each be connected vehicles that are able to communicate with a remote device 208 such as a central server and/or each other, for example by virtue of a modem embedded on each of the vehicles 101, 105. In one arrangement, each of the vehicles 101, 105 may be respective vehicles of a fleet of vehicles configured to communicate with one another other directly and/or via a central server. Where the vehicles 101, 105 are able to communicate with one another, the control system of the tilting vehicle 101 may be configured to control the amount by which the vehicle 101 tilts based upon an operational condition of another vehicle, e.g. the motorcycle 105. For example, a GPS system of one of the tilting vehicle 101 and another vehicle, e.g. the motorcycle 105, may be used to determine that the course of one of the vehicles 101, 105 will bring the vehicles 101, 105 into close proximity and/or contact with each other. In this manner, the control system of the tilting vehicle 101 may be configured to cause the vehicle 101 to tilt based upon data received from another vehicle that the tilting vehicle 101 is in communication with, either directly and/or via a central server.

FIGS. 1A, 1B, and 1C depict a scenario where the other article 103 is a motorcycle 105 that is moving towards the tilting vehicle 101. However, in another arrangement (not shown), the vehicle 101 may be moving and the other article 103 may be a static article, such as a parked vehicle or a structure, such as a wall, a column or a barrier. In a circumstance where the tilting vehicle 101 is moving towards the other article 103, the method 100 may comprise a step of tilting the vehicle 101 whilst the vehicle 101 is moving. For example, a driver of the vehicle 101 may be maneuvering into a parking space that is next to the other article 103, e.g. a post or another parked vehicle. In such a circumstance, it is common for the driver to use one or more parking aids of the vehicle 101, e.g. a proximity sensor, a parking spot measurement system, and/or a BLIS, to help avoid the vehicle 101 colliding with the other article 103, whilst the driver is maneuvering the vehicle 101. However, in some situations, the driver may have disabled one or more of the parking aids, or simply may not pay attention to the parking aids, which may result in a collision between the vehicle 101 and the other article 103. As such, the control system of the vehicle 101 may be configured to tilt the vehicle 101 away from the other article 103 as the vehicle 101 approaches the other article 103. For example, the control system may be configured to tilt the vehicle 101 away from an overhead obstruction, such as a barrier or a sign, so as to avoid contact between the vehicle and the overhead obstruction as the vehicle 101 performs a maneuver.

Thus, the present disclosure is advantageous as it provides a method 100 and system for moving, e.g. automatically moving, the vehicle 101 away from another article 103. In this manner, a collision between the vehicle 101 and the other article 103 may be avoided by moving, e.g. tilting, the vehicle 101 out of the way of the intended course of the vehicle 101 and/or the other article 103.

In one arrangement, the driver of the vehicle 101 may wish to manually tilt the vehicle 101, for example to avoid colliding with another article 103, to tilt the vehicle 101 to increase the visibility of the driver, and/or to aid the entry/exit into and out of the vehicle 101. In order to do so, the control system of the vehicle 101 may comprise at least one control switch or user input 210, e.g. a lever, button or dial, configured to control the amount by which the vehicle 101 tilts. Further, the control system may be configured to determine an operational state of the vehicle via a vehicle state sensor or input 206. For example the control system may be configured to determine: if the vehicle 101 is stationary; if the vehicle 101, e.g. a drive motor of the vehicle, is switched off; if a parking brake of the vehicle 101 is at least partially engaged; and/or if the driver of the vehicle 101 has a foot on a brake pedal. Upon determination of the operational condition of the vehicle, the control system may be configured to selectively activate/deactivate the operation of the control switch. In this manner, if it is determined that the vehicle 101 is stationary, the vehicle 101 is switched off, a parking brake of the vehicle 101 is at least partially engaged, and/or the driver of the vehicle 101 has a foot on a brake pedal, the control system may activate the control switch to allow the driver to tilt the vehicle 101 manually.

In one arrangement, the steering wheel of the vehicle 101 may be used to control the tilting of the vehicle 101, i.e. the steering wheel itself may function as the control switch 210 or may be operatively connected to the control switch 210. For example, the steering wheel, e.g. a radial plane of the steering wheel, may be configured to tilt relative to the rotational axis of the steering wheel and/or steering column to cause the vehicle to tilt. In some cases, manual control of the tilting function of the vehicle 101 may be useful in enabling the driver to see around/past stationary traffic parked in front of the vehicle 101 in order to ascertain what is happening further up the road. Where the control system is configured to determine the operational state of the vehicle 101 as described above, the present disclosure allows for automatic switching between the driver of the vehicle 101 using the steering wheel to control: the direction of the vehicle 101; and the amount by which the vehicle 101 tilts, for example by virtue of the selective activation/deactivation of the operation of the control switch.

Figure 2:
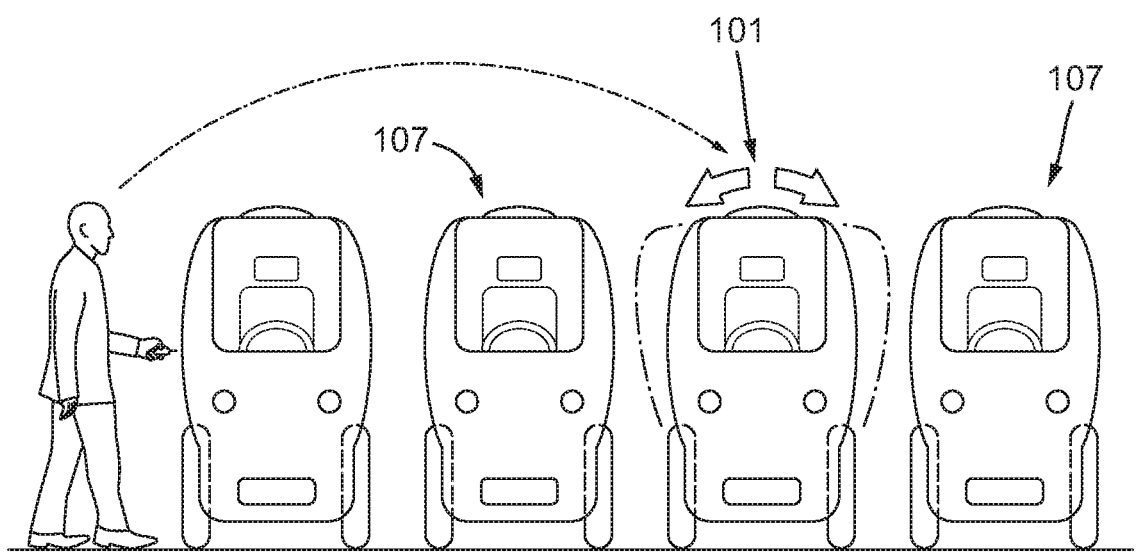
FIG. 2 illustrates a method of tilting a vehicle.
Figure 5:
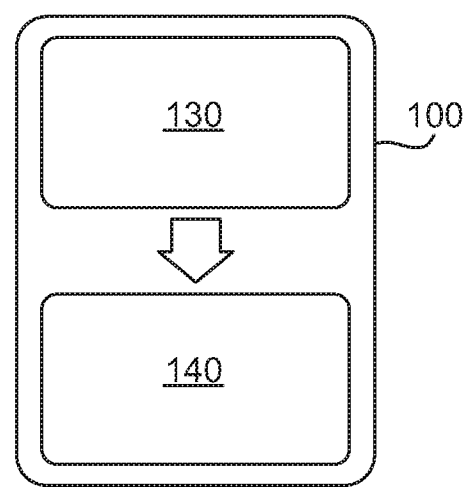
Figure 6:
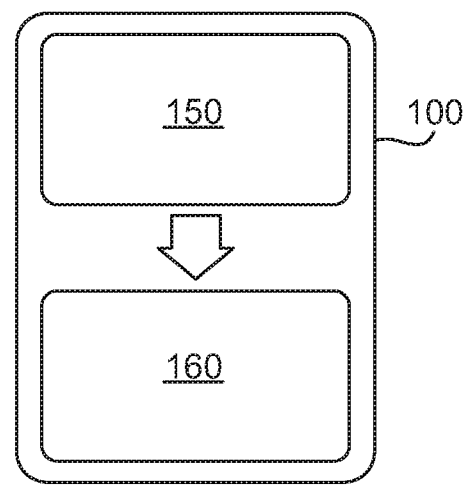

FIG. 2 illustrates another manner in which the vehicle 101 may be tilted. FIG. 2 shows the tilting vehicle 101 parked in between two other articles 103, e.g. two other vehicles 107. In one arrangement, the vehicles 101, 107 may be similar vehicles, for example where the vehicles 101, 107 are part of a fleet of vehicles, such as vehicles of a fleet of rental vehicles. However, the articles 103 on either side of, in front or behind of, or close to, the tilting vehicle 101 may be any appropriate type of article 103. FIG. 5 shows a flow chart comprising steps 130 and 140, which may be used by the control system to control the amount by which the vehicle 101 tilts. FIG. 5 shows a flowchart that depicts the method 100 of tilting the vehicle 101, the method 100 having steps 130 and 140, which correspond to the arrangement illustrated in FIG. 2. Although not shown, steps 130 and 140 of FIG. 5 may be used in conjunction with any of steps 110 and 120 of FIG. 5, and any of steps 150 and 160 of FIG. 6, where technically possible.

Where the vehicle is parked in between two other similar vehicles 107, as shown in FIG. 2, the driver of the vehicle 101 may not be able to recognise which of the vehicles 101, 107 is the vehicle that they intend to drive. In other circumstances, the driver may have simply forgotten where they have parked their own vehicle in a row of vehicles in a parking lot. In either case, the driver of the vehicle 101 may not be able to establish the location of their vehicle 101. The present disclosure is advantageous is it provides a method 100 of advertising the location of the vehicle 101 by virtue of the tilting functionality of the vehicle 101.

FIG. 2 shows a driver of the vehicle 101 approaching a row of vehicles 101, 107. In order for the driver to determine which of the vehicles 101, 107 is the vehicle that they intend to drive, the control system of the vehicle 101 is configured to initiate a tilting sequence (step 140) upon the control system of the vehicle 101 receiving a signal (step 130) from at least one of a central server, a mobile device and a vehicle key.

In the arrangement shown in FIG. 2, the driver actively causes the signal to be sent using an application installed on the driver's mobile device, for example by virtue of the driver pressing a button displayed on the screen of the mobile device. The mobile device may be configured to communicate directly with the control system of the vehicle 101 as an input 210, and/or via a central server and/or one or more other mobile devices as a remote device 208. Additionally or alternatively, the mobile device may be configured to function as a Phone as a Key (PaaK) configured to communicate with the vehicle 101, e.g. via a modem installed on the vehicle 101, to inform the control system of the vehicle that the driver is approaching. In this manner, as the driver approaches the vehicle, for example as the driver comes within a predetermined distance of the vehicle, and the control system receives a signal (step 130) from the driver's mobile device, the control system of the vehicle 101 causes the initiation of the tilting sequence (step 140), so that the driver's attention is drawn towards the vehicle 101.

Additionally or alternatively, a vehicle key, such as a remote central locking fob, may be configured to communicate with the vehicle 101 in order to initiate the tilting sequence, for example by virtue of the driver depressing a button on the key fob and/or by virtue of the key fob communicating automatically with the control system of the vehicle 101, e.g. when the key fob comes within a certain distance of the vehicle 101.

The tilting sequence may comprise a plurality of discrete tilting motions. For example, the tilting sequence may comprise a first movement to tilt the vehicle in a first direction, and a second movement to tilt the vehicle in a second direction that is different, e.g. opposite, to the first direction. The first movement may cause the vehicle 101 to tilt towards one side of the vehicle 101, and the second movement may cause the vehicle 101 to tilt towards the another side of the vehicle 101. The tilting sequence may comprise any appropriate number of tilting motions, for example to cause the vehicle 101 to rock from side to side, and/or front to back, in order to attract attention.

In one arrangement, the tilting sequence may comprise a first movement to tilt the vehicle 101 in a first direction, e.g. towards one side of the vehicle 101, and a second movement to further tilt the vehicle 101 in the first direction. Indeed, the tilting sequence may comprise tilting the vehicle 101 in at least one of a forwards, backwards and sideways direction. In one arrangement, the tilting sequence may comprise various stages, or levels, of tilting, each stage comprising a different amount of tilting and/or a different tilting sequence. For example, when the control system receives the signal (step 130), the control system may be configured to initiate (step 140) a first tilting sequence, and subsequently a second tilting sequence, which is different to the first tilting sequence. For example, the first tilting sequence may be a sequence in which the vehicle 101 tilts by a small amount and/or for a short period, and the second tilting sequence may be a sequence in which the vehicle 101 tilts by a larger amount and/or for a longer period. In this manner, the intensity of the tilting motion may increase depending on the period taken for the driver to find/access the vehicle 101. In one arrangement, the tilting sequence may occur in conjunction with the flashing of one or more of the vehicle's lights and/or with the sounding of the vehicle's horn.

The above described initiation of the tilting sequence (step 140) may be particularly useful when the vehicle 101 is a rental vehicle (hire vehicle), with which the renter may be unfamiliar. For example, when a renter of the vehicle 101 approaches a long line of vehicles, which may be similar to the tilting vehicle 101, the control system of the vehicle 101 may be configured to communicate with a rental application on the renter's mobile device to inform the vehicle 101 via a signal sent from the mobile device (step 130) that an authorized renter is approaching. In this manner, the tilting sequence (step 140) can be initiated so the renter can identify which of the vehicles is the rented vehicle.

In another arrangement, the tilting sequence may be used to attract the attention of an individual, e.g. a potential renter, as the individual passes near to the vehicle 101. For example, where the individual is carrying a mobile device having a rental application installed on the mobile device, the application and the control system of the vehicle 101 may be configured to communicate with each other (step 130) to initiate the tilting sequence (step 140) to advertise the availability of the vehicle 101 to the passing individual. In such an arrangement, the tilting of the vehicle 101 may be initiated when the potential renter approaches a rental location. For example, the mobile device of the individual may be configured to communicate with the control system of the vehicle 101 when the individual's mobile device determines that the individual is at, or within a predetermined distance of, a predetermined GPS location.

Figure 3A:
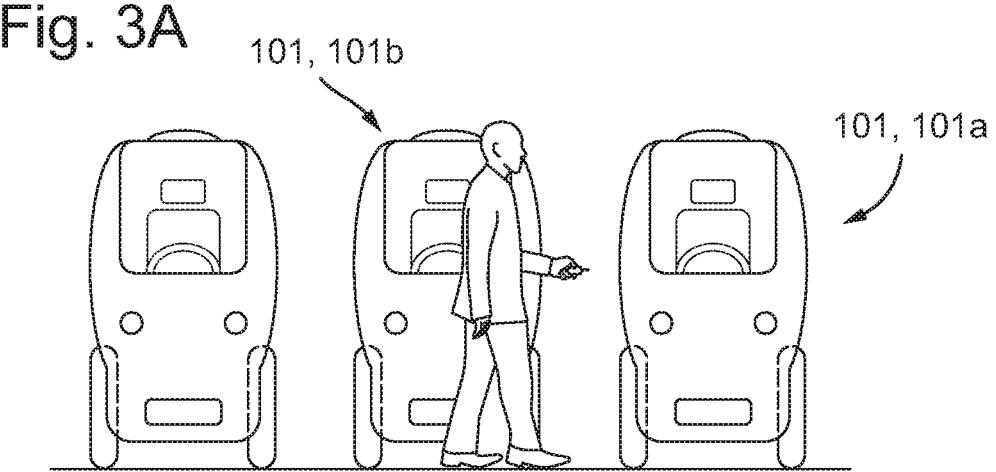
FIGS. 3A, 3B, and 3C illustrate a method of tilting a vehicle.
Figure 3B:
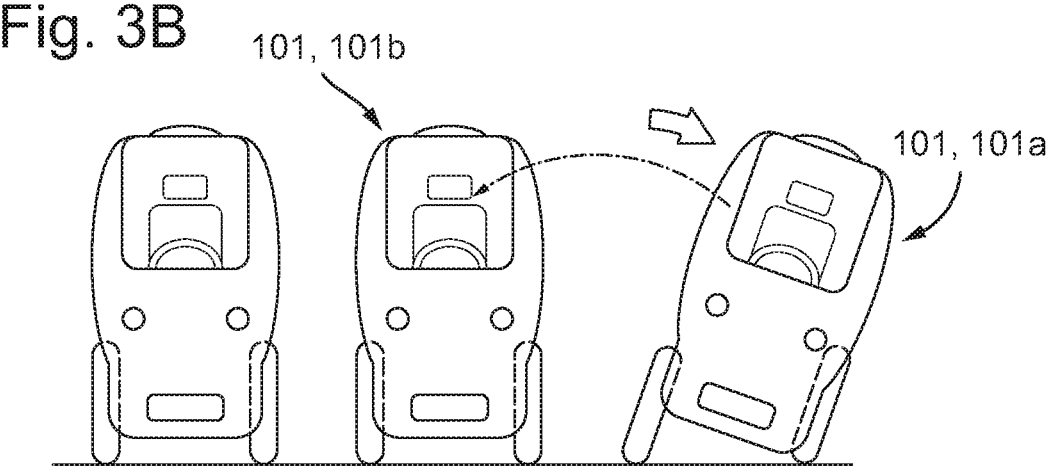
Figure 3C:
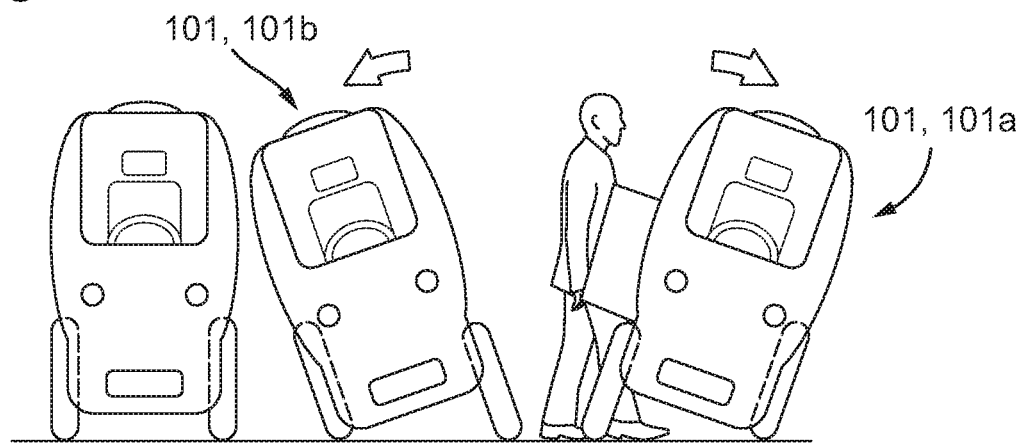

FIGS. 3A, 3B, and 3C illustrate another manner in which the vehicle 101 may be tilted. FIGS. 3A, 3B, and 3C show a tilting vehicle 101 parked next to another tilting vehicle 101. Such a situation may arise where the tilting vehicles 101 are part of a fleet of vehicle, such as a share/hire fleet, or where owners of similar tilting vehicles 101 take advantage of small parking spaces, for example. However, one problem associated with parking the tilting vehicles 101 so close to each other is that access into and/or out of the vehicles 101 may be impeded. FIG. 5 shows a flowchart that depicts the method 100 of tilting the vehicle 101, the method 100 having steps 150 and 160, which correspond to the arrangement illustrated in FIGS. 3A, 3B, and 3C. Although not shown, any of steps 150 and 160 of FIG. 6 may be used in conjunction with any of steps 110, 120, 130 and 140, where technically possible.

In FIG. 3A, an individual who wishes to access a first tilting vehicle 101a is prevented from doing so as a result of the first tilting vehicle 101a being parked close to a second tilting vehicle 101b. In order to allow the individual to gain access to the first vehicle 101a, the control system of the first vehicle 101a is configured to cause the first vehicle 101a to lean away from the second vehicle 101b. In a similar manner to that described above, the first vehicle 101a may be caused to tilt by virtue of the automatic recognition of a vehicle key, such as a key fob, and/or a PaaK, which communicate with the vehicle 101a to inform the control system that the individual is approaching. Additionally or alternatively, the individual may manually control the tilting of the vehicle 101a using at least one of a vehicle key and an application installed on a mobile device, or any other appropriate remote control. Where the individual is able to manually control the amount by which the vehicle tilts, the individual is able to evaluate an appropriate amount of tilt according to the particular parking condition of the vehicle 101a. In one arrangement, a parking sensor of the vehicle 101a may be used to prevent the vehicle 101a from tilting so much that it contacts another article.

In FIG. 3B, the first vehicle 101a has been tilted away from the second vehicle 101b to increase the spacing between the vehicles 101a, 101b. However, in some situations, the increase in spacing between the vehicles 101a, 101b caused by the tilting of the first vehicle 101a may be insufficient for the needs of the individual, for example if the individual wishes to load bulky cargo into and/or out of the vehicle 101a.

In order to further increase the spacing between the vehicles 101a, 101b, the method comprises a step 150 of sending a signal from the control system of the first vehicle 101a to the second tilting vehicle 101b. The signal may be sent directly to the second vehicle 101b, and/or via a central server. For example, when the first vehicle 101a tilts in response to the individual's proximity to a door of the vehicle, the control system of the vehicle 101a is configured to send out a signal, e.g. a tilting signal, to inform the second vehicle 101b that vehicle 101a is tilting (or is about to tilt). The control system of the second vehicle 101b is configured to poll, e.g. continuously check, for any signal from adjacent vehicles, e.g. in a similar manner to a vehicle configured poll for approaching keyless entry systems. When an appropriate tilting signal is detected by the second vehicle 101b, the method comprises a step 160 of tilting the second vehicle 101b, for example in a direction away from the first vehicle 101b.

In one arrangement, the first and second vehicles 101a, 101b may be configured to tilt simultaneously. For example, the control system of the first vehicle 101a may be configured to delay the tilting of the first vehicle 101a until a signal has been sent and received to cause the second vehicle 101b to tilt. In this manner, the vehicles 101a, 101b are configured to tilt in unison.

The first and second vehicles 101a, 101b may be configured to tilt by the same amount. For example, each of the first and second vehicles 101a, 101b may configured to tilt such that a vertical plane bisects the angle in between the first and second vehicles 101a, 101b. In another arrangement, the first and second vehicles 101a, 101b may be configured to tilt by different amounts. For example, the first vehicle 101a may be inclined towards a horizontal plane by a first amount, and the first vehicle 101a may be inclined towards a horizontal plane by a second amount.

In one arrangement, upon the second vehicle 101b receiving a signal from the first vehicle 101a, an operative connection may be established between the control system of the first vehicle 101a and the control system of the second vehicle 101b to allow the individual to control manually the amount by which the second vehicle 101b tilts. For example, when an operative connection has been established between respective control systems of the first and second vehicles 101a, 101b, the individual may be able to control the amount by which the second vehicle 101b tilts using an application installed on the individual's mobile device, and/or using a key fob of the first vehicle 101a.

Where the vehicles 101, e.g. the first and second vehicles 101a, 101b are electric/hybrid vehicles, the tilting function of the first vehicle 101a and/or the second vehicle 101b may be enabled, e.g. only enabled, when each of the respective vehicles 101a, 101b is plugged into a charging point. For example, the ability for the individual to control the tilting of the first and/or second vehicles 101a, 101b may be disabled when at least one of the first and second vehicles 101a, 101b is not connected to a charging point.

The method may comprise moving, e.g. tilting, a seat of the vehicle depending on the amount by which the vehicle tilts. A seat tilt controller 214 is in communication with the control system 200, and controls a seat tilt mechanism 216 connected to the seat and having actuators to control the tilt of the seat. For example, where the vehicle tilts in order to increase the ease of access into or out of the vehicle, a seat of the vehicle may be configured to tilt, for example in a direction opposite to that in which the vehicle tilts.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A method of tilting a vehicle, comprising:
in response to an external trigger being received by a tilt control system, actuating an active suspension system to tilt the vehicle without lifting traction devices of the vehicle from an underlying surface receiving a signal indicative of a location of a mobile device and/or a vehicle key as the external trigger;
actuating the active suspension system to tilt the vehicle when the mobile device and/or the vehicle key is at a predetermined location;
in response to receiving the external trigger and tilting the vehicle, controlling a vehicle seat tilt mechanism to tilt a vehicle seat in a direction opposite to the vehicle tilt;
wherein the active suspension system is actuated to tilt the vehicle in a tilting sequence in response to receiving the external trigger with a first movement to tilt the vehicle in a first direction, a return movement to a neutral position, a second movement to tilt the vehicle in a second direction that is different to the first direction, and another return movement to the neutral position.

2. The method of claim 1 further comprising, in response to the external trigger being received by the tilt control system, sending a signal from the tilt control system to a central server and/or another vehicle to cause the another vehicle to tilt.

3. The method of claim 2 wherein the vehicle is tilted in a first direction; and
wherein the signal causes the another vehicle to tilt in a second direction that is different to the first direction.

4. The method of claim 1 further comprising sending a signal from a proximity sensor on the vehicle to the tilt control system for use as the external trigger, the external trigger provided when another article is less than a predetermined distance from the vehicle.

5. The method of claim 4 wherein the active suspension system is actuated to control the vehicle tilt to an amount proportional to a distance between the vehicle and the other article.

6. The method of claim 1 further comprising receiving a signal from a central server for use as the external trigger.

7. The method of claim 1 further comprising receiving a signal indicative of a collision risk from a course of the vehicle and/or a course of another article as the external trigger; wherein the active suspension system is actuated to tilt the vehicle to mitigate the collision risk between the vehicle and another article.

8. The method of claim 1 wherein in response to the external trigger being received by the tilt control system, actuating the active suspension system to tilt the vehicle while the vehicle is stationary.

9. The method of claim 1 wherein in response to the external trigger being received by the tilt control system, actuating the active suspension system to tilt the vehicle while the vehicle is connected to a vehicle charging point.

10. The method of claim 1 in response to the external trigger being received by the tilt control system, actuating the active suspension system to tilt the vehicle while the vehicle is switched off.

11. The method of claim 1 further comprising receiving a signal indicative of a location of the vehicle as the external trigger;
wherein the active suspension system is actuated to tilt the vehicle when the vehicle is at or near to a predetermined location.

12. The method of claim 1 wherein the external trigger is a tilting motion of a steering wheel such that the tilting motion causes the vehicle to tilt.

13. A method of tilting a vehicle, comprising:
in response to an external trigger being received by a tilt control system, actuating an active suspension system to tilt the vehicle without lifting traction devices of the vehicle from an underlying surface; and
receiving a signal indicative of a location of a mobile device and/or a vehicle key as the external trigger;
controlling the active suspension system to a tilting sequence via the tilt control system in response to receiving a signal from a central server, a mobile device, and/or a vehicle key, the signal providing the external trigger, wherein the active suspension system tilts the vehicle in the tilting sequence to tilt the vehicle in a first direction, a return movement to a neutral position, a second movement to tilt the vehicle in a second direction that is different to the first direction, and another return movement to the neutral position; and
controlling a vehicle seat tilt mechanism to tilt a vehicle seat in a direction opposite to the vehicle tilt via the tilt control system in response to the external trigger and the vehicle tilting;
wherein the active suspension system is actuated to tilt the vehicle when the mobile device and/or the vehicle key is at a predetermined location.

14. A vehicle comprising:
an active suspension system connected to a plurality of traction devices;
a vehicle seat with a vehicle seat tilt mechanism; and
a tilt control system to, in response to receiving an external trigger, control the active suspension system to tilt the vehicle without lifting the plurality of traction devices from an underlying surface, and/or send a signal indicative of a tilt command thereby causing another vehicle to tilt;
wherein the tilt control system, in response to the external trigger and tilting the vehicle, controls the vehicle seat tilt mechanism to tilt the vehicle seat in a direction
wherein the tilt control system receives a signal indicative of a location of a mobile device and/or a vehicle key as the external trigger;
wherein the active suspension system is actuated to tilt the vehicle when the mobile device and/or the vehicle key is at a predetermined location; and
wherein the tilt control system controls the active suspension system to a tilting sequence in response to receiving a signal from a central server, a mobile device, and/or a vehicle key, the signal providing the external trigger, wherein the active suspension system tilts the vehicle in the tilting sequence to tilt the vehicle in a first direction, a return movement to a neutral position, a second movement to tilt the vehicle in a second direction that is different to the first direction, and another return movement to the neutral position.

15. The vehicle of claim 14, wherein the signal is sent by the tilt control system, a central server and/or the another vehicle to cause the another tilting vehicle to tilt.

16. The vehicle of claim 14 further comprising a proximity sensor in communication with the tilt control system, the tilt control system to receive a signal from the proximity sensor as the external trigger, and tilt the vehicle when the proximity sensor detects that another article is within a predetermined distance of the vehicle.

* * * * *